US008175253B2

(12) United States Patent
Knott et al.

(10) Patent No.: US 8,175,253 B2
(45) Date of Patent: May 8, 2012

(54) SYSTEM AND METHOD FOR AUTOMATED PERFORMANCE MONITORING FOR A CALL SERVICING SYSTEM

(75) Inventors: Benjamin Anthony Knott, Round Rock, TX (US); Robert R. Bushey, Cedar Park, TX (US); John Mills Martin, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1079 days.

(21) Appl. No.: 11/176,972

(22) Filed: Jul. 7, 2005

(65) Prior Publication Data

US 2007/0025528 A1 Feb. 1, 2007

(51) Int. Cl.
*H04M 3/00* (2006.01)
(52) U.S. Cl. .................. 379/265.03; 379/32.01; 379/33; 379/265.02; 379/265.06; 379/265.07
(58) Field of Classification Search ............. 379/265.06, 379/265.07, 265.08, 266.08, 32.01, 33, 265.02, 379/265.03
See application file for complete search history.

(56) References Cited

U.S. PATENT DOCUMENTS

| | | | |
|---|---|---|---|
| 4,953,204 A | 8/1990 | Cuschleg, Jr. et al. | |
| 4,967,405 A | 10/1990 | Upp et al. | |
| 5,335,269 A | 8/1994 | Steinlicht | |
| 5,530,744 A | 6/1996 | Charalambous et al. | |
| 5,590,186 A | 12/1996 | Liao et al. | |
| 5,953,704 A | 9/1999 | McIlroy et al. | |

(Continued)

FOREIGN PATENT DOCUMENTS

EP 0 424 015 A2 4/1991
(Continued)

OTHER PUBLICATIONS

U.S. Appl. No. 10/898,722, filed Jul. 23, 2004.
(Continued)

*Primary Examiner* — Antim Shah
(74) *Attorney, Agent, or Firm* — Toler Law Group, PC

(57) ABSTRACT

A system and method for monitoring and reporting automated call-processing performance is disclosed. Initially, performance metrics can be established for normal or acceptable system performance. Performance metrics may be determined for individual components and/or a combination of components in a system, wherein the individual metric may help to provide a performance indicator for the call processing system. The performance metrics can be established by utilizing historical data gathered from past operating characteristics or operating parameters. The performance metric can be calculated from past operating characteristics and could be a statistical distribution or a statistical value. This statistical distribution will often conform to a Gaussian distribution also known as a bell curve. However, acceptable performance limits can be set based on nearly any statistical distribution. A monitor can collect data over a predetermined time interval and process the monitored data to provide a "near" real-time performance data. When the near real time performance data falls within a pre-defined range of normal operation (based on the statistical distribution) system operation is most likely acceptable and operation proceeds. However, when the system performance data is outside of a normal range of operation, beyond a performance metric or exceeds a threshold value an alarm can be set to notify a human or an electronic device.

20 Claims, 3 Drawing Sheets

U.S. PATENT DOCUMENTS

| | | | |
|---|---|---|---|
| 6,119,101 A | 9/2000 | Peckover | |
| 6,173,266 B1 | 1/2001 | Marx et al. | |
| 6,269,153 B1 | 7/2001 | Carpenter et al. | |
| 6,317,439 B1 | 11/2001 | Cardona et al. | |
| 6,333,980 B1 | 12/2001 | Hollatz et al. | |
| 6,381,329 B1 | 4/2002 | Uppaluru et al. | |
| 6,385,584 B1 | 5/2002 | McAllister et al. | |
| 6,389,400 B1 | 5/2002 | Bushey et al. | |
| 6,400,804 B1 | 6/2002 | Bilder | |
| 6,400,996 B1 | 6/2002 | Hoffberg et al. | |
| 6,405,159 B2 | 6/2002 | Bushey et al. | |
| 6,414,966 B1 | 7/2002 | Kulkarni et al. | |
| 6,418,424 B1 | 7/2002 | Hoffberg et al. | |
| 6,510,414 B1 | 1/2003 | Chaves | |
| 6,519,562 B1 | 2/2003 | Phillips et al. | |
| 6,529,871 B1 | 3/2003 | Kanevsky et al. | |
| 6,570,967 B2 | 5/2003 | Katz | |
| 6,598,136 B1 | 7/2003 | Norrod et al. | |
| 6,614,781 B1 | 9/2003 | Elliott et al. | |
| 6,631,186 B1 | 10/2003 | Adams et al. | |
| 6,678,360 B1 | 1/2004 | Katz | |
| 6,690,788 B1 | 2/2004 | Bauer et al. | |
| 6,694,012 B1 | 2/2004 | Posthuma | |
| 6,697,460 B2 | 2/2004 | Knott et al. | |
| 6,700,972 B1 | 3/2004 | McHugh et al. | |
| 6,707,789 B1 | 3/2004 | Arslan et al. | |
| 6,714,631 B1 | 3/2004 | Martin et al. | |
| 6,721,416 B1 | 4/2004 | Farrell | |
| 6,751,306 B2 | 6/2004 | Himmel et al. | |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,792,096 B2 | 9/2004 | Martin et al. | |
| 6,807,274 B2 | 10/2004 | Joseph et al. | |
| 6,831,932 B1 | 12/2004 | Boyle et al. | |
| 6,832,224 B2 | 12/2004 | Gilmour | |
| 6,842,504 B2 | 1/2005 | Mills et al. | |
| 6,847,711 B2 | 1/2005 | Knott et al. | |
| 6,853,722 B2 | 2/2005 | Joseph et al. | |
| 6,853,966 B2 | 2/2005 | Bushey et al. | |
| 6,885,734 B1 | 4/2005 | Eberle et al. | |
| 6,891,932 B2 | 5/2005 | Bhargava et al. | |
| 6,901,366 B1 | 5/2005 | Kuhn et al. | |
| 6,907,119 B2 | 6/2005 | Case et al. | |
| 7,076,695 B2 * | 7/2006 | McGee et al. | 714/47 |
| 2001/0011211 A1 | 8/2001 | Bushey et al. | |
| 2001/0018672 A1 | 8/2001 | Petters et al. | |
| 2001/0032229 A1 | 10/2001 | Hulls et al. | |
| 2001/0034662 A1 | 10/2001 | Morris | |
| 2002/0087385 A1 | 7/2002 | Vincent | |
| 2002/0133394 A1 | 9/2002 | Bushey et al. | |
| 2002/0133413 A1 | 9/2002 | Chang et al. | |
| 2002/0156699 A1 | 10/2002 | Gray et al. | |
| 2002/0196277 A1 | 12/2002 | Bushey et al. | |
| 2003/0026409 A1 | 2/2003 | Bushey et al. | |
| 2003/0064720 A1 * | 4/2003 | Valins et al. | 455/423 |
| 2003/0143981 A1 | 7/2003 | Kortum et al. | |
| 2003/0144919 A1 | 7/2003 | Trompette et al. | |
| 2003/0156133 A1 | 8/2003 | Martin et al. | |
| 2003/0187732 A1 | 10/2003 | Seta | |
| 2003/0187773 A1 | 10/2003 | Santos et al. | |
| 2003/0194063 A1 | 10/2003 | Martin et al. | |
| 2003/0202640 A1 | 10/2003 | Knott et al. | |
| 2003/0202643 A1 | 10/2003 | Joseph et al. | |
| 2003/0202649 A1 | 10/2003 | Haug, Jr. et al. | |
| 2003/0204435 A1 | 10/2003 | McQuilkin et al. | |
| 2004/0005047 A1 | 1/2004 | Joseph et al. | |
| 2004/0006473 A1 | 1/2004 | Mills et al. | |
| 2004/0032862 A1 | 2/2004 | Schoeneberger et al. | |
| 2004/0032935 A1 | 2/2004 | Mills et al. | |
| 2004/0042592 A1 | 3/2004 | Knott et al. | |
| 2004/0044950 A1 | 3/2004 | Mills et al. | |
| 2004/0066401 A1 | 4/2004 | Bushey et al. | |
| 2004/0066416 A1 | 4/2004 | Knott et al. | |
| 2004/0073569 A1 | 4/2004 | Knott et al. | |
| 2004/0088285 A1 | 5/2004 | Martin et al. | |
| 2004/0103017 A1 | 5/2004 | Reed et al. | |
| 2004/0109555 A1 | 6/2004 | Williams | |
| 2004/0125937 A1 | 7/2004 | Turcan et al. | |
| 2004/0125938 A1 | 7/2004 | Turcan et al. | |
| 2004/0125940 A1 | 7/2004 | Turcan et al. | |
| 2004/0161078 A1 | 8/2004 | Knott et al. | |
| 2004/0161094 A1 | 8/2004 | Martin et al. | |
| 2004/0161096 A1 | 8/2004 | Knott et al. | |
| 2004/0174980 A1 | 9/2004 | Knott et al. | |
| 2004/0230438 A1 | 11/2004 | Pasquale et al. | |
| 2004/0240635 A1 | 12/2004 | Bushey et al. | |
| 2004/0243568 A1 | 12/2004 | Wang et al. | |
| 2004/0264677 A1 * | 12/2004 | Horvitz et al. | 379/265.02 |
| 2005/0008141 A1 | 1/2005 | Kortum et al. | |
| 2005/0015744 A1 | 1/2005 | Bushey et al. | |
| 2005/0027535 A1 | 2/2005 | Martin et al. | |
| 2005/0041796 A1 | 2/2005 | Joseph et al. | |
| 2005/0047578 A1 | 3/2005 | Knott et al. | |
| 2005/0055216 A1 | 3/2005 | Bushey et al. | |
| 2005/0058264 A1 | 3/2005 | Joseph et al. | |
| 2005/0075894 A1 | 4/2005 | Bushey et al. | |
| 2005/0078805 A1 | 4/2005 | Mills et al. | |
| 2005/0080630 A1 | 4/2005 | Mills et al. | |
| 2005/0080667 A1 | 4/2005 | Knott et al. | |
| 2005/0131892 A1 | 6/2005 | Knott et al. | |
| 2005/0132262 A1 | 6/2005 | Bushey et al. | |
| 2005/0135595 A1 | 6/2005 | Bushey et al. | |
| 2005/0169453 A1 | 8/2005 | Knott et al. | |
| 2006/0073013 A1 * | 4/2006 | Emigholz et al. | 416/35 |
| 2006/0176824 A1 * | 8/2006 | Laver et al. | 370/241 |
| 2006/0188075 A1 * | 8/2006 | Peterson | 379/67.1 |

FOREIGN PATENT DOCUMENTS

| | | |
|---|---|---|
| EP | 0 424 015 A3 | 4/1991 |
| EP | 0 424 015 B1 | 4/1991 |
| EP | 0 876 652 A4 | 9/1996 |
| WO | WO 97/26612 | 7/1997 |
| WO | WO 01/37539 A2 | 5/2001 |
| WO | WO 01/37539 A3 | 5/2001 |
| WO | WO 2004/017584 | 2/2004 |
| WO | WO 2004/049222 A2 | 6/2004 |

OTHER PUBLICATIONS

U.S. Appl. No. 10/901,926, filed Jul. 28, 2004.
U.S. Appl. No. 10/901,925, filed Jul. 28, 2004.
U.S. Appl. No. 10/917,233, filed Aug. 12, 2004.
U.S. Appl. No. 10/935,726, filed Sep. 7, 2004.
U.S. Appl. No. 10/999,199, filed Nov. 29, 2004.
U.S. Appl. No. 11/005,498, filed Dec. 6, 2004.
U.S. Appl. No. 11/005,494, filed Dec. 6, 2004.
U.S. Appl. No. 11/010,633, filed Dec. 13, 2004.
U.S. Appl. No. 11/032,495, filed Jan. 10, 2005.
U.S. Appl. No. 11/036,204, filed Jan. 14, 2005.
U.S. Appl. No. 11/036,201, filed Jan. 14, 2005.
U.S. Appl. No. 11/062,100, filed Feb. 18, 2005.
U.S. Appl. No. 11/071,068, filed Mar. 3, 2005.
U.S. Appl. No. 11/086,796, filed Mar. 23, 2005.
U.S. Appl. No. 11/129,051, filed May 13, 2005.
U.S. Appl. No. 11/145,513, filed Jun. 3, 2005.
U.S. Appl. No. 11/173,227, filed Jul. 1, 2005.
U.S. Appl. No. 10/975,023, filed Oct. 27, 2004.
U.S. Appl. No. 11/086,794, filed Mar. 22, 2005.
U.S. Appl. No. 10/996,127, filed Nov. 23, 2004.
U.S. Appl. No. 10/920,719, filed Dec. 13, 2004.
U.S. Appl. No. 10/920,720, filed Aug. 18, 2004.
U.S. Appl. No. 10/948,089, filed Sep. 23, 2004.
U.S. Appl. No. 10/979,784, filed Nov. 2, 2004.
U.S. Appl. No. 11/212,939, filed Aug. 25, 2005.

* cited by examiner

SYSTEM AND METHOD FOR AUTOMATED PERFORMANCE MONITORING FOR A CALL SERVICING SYSTEM

FIELD OF THE DISCLOSURE

The present disclosure relates generally to call servicing systems, and more particularly, to a system and method for monitoring a call servicing system.

BACKGROUND

Telephone call servicing centers that have interactive voice response systems (IVRS)(s) continue to improve by implementing new technologies. One such recent development is a speech recognition technology that supports a "natural language" type interaction between automated systems and customers. A natural language interaction allows a customer to speak naturally, and a voice recognition system can route a call or provide requested information responsive to the freely spoken dialect. A goal of an IVRS is to determine why a customer is calling a service center and to provide the customer with information, or route the customer to an appropriate agent or destination. Ensuring that a given IVRS is operating properly and accurately is often very difficult. An IVRS is typically comprised of multiple components that can operate at less than peak efficiency or even fail. One significant problem that occurs in IVRSs is that certain failures degrade system performance but do not cause total failure, wherein detection of such a failure is difficult. Call centers often service a huge volume of calls and even if a small percentage of calls are improperly serviced, the costs associated with such calls are significant. In addition, unsuccessful call servicing can result in caller dissatisfaction. Accordingly, there is a need for an improved method and system for tracking automated call center performance.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

DETAILED DESCRIPTION OF THE DRAWINGS

Figure 1:
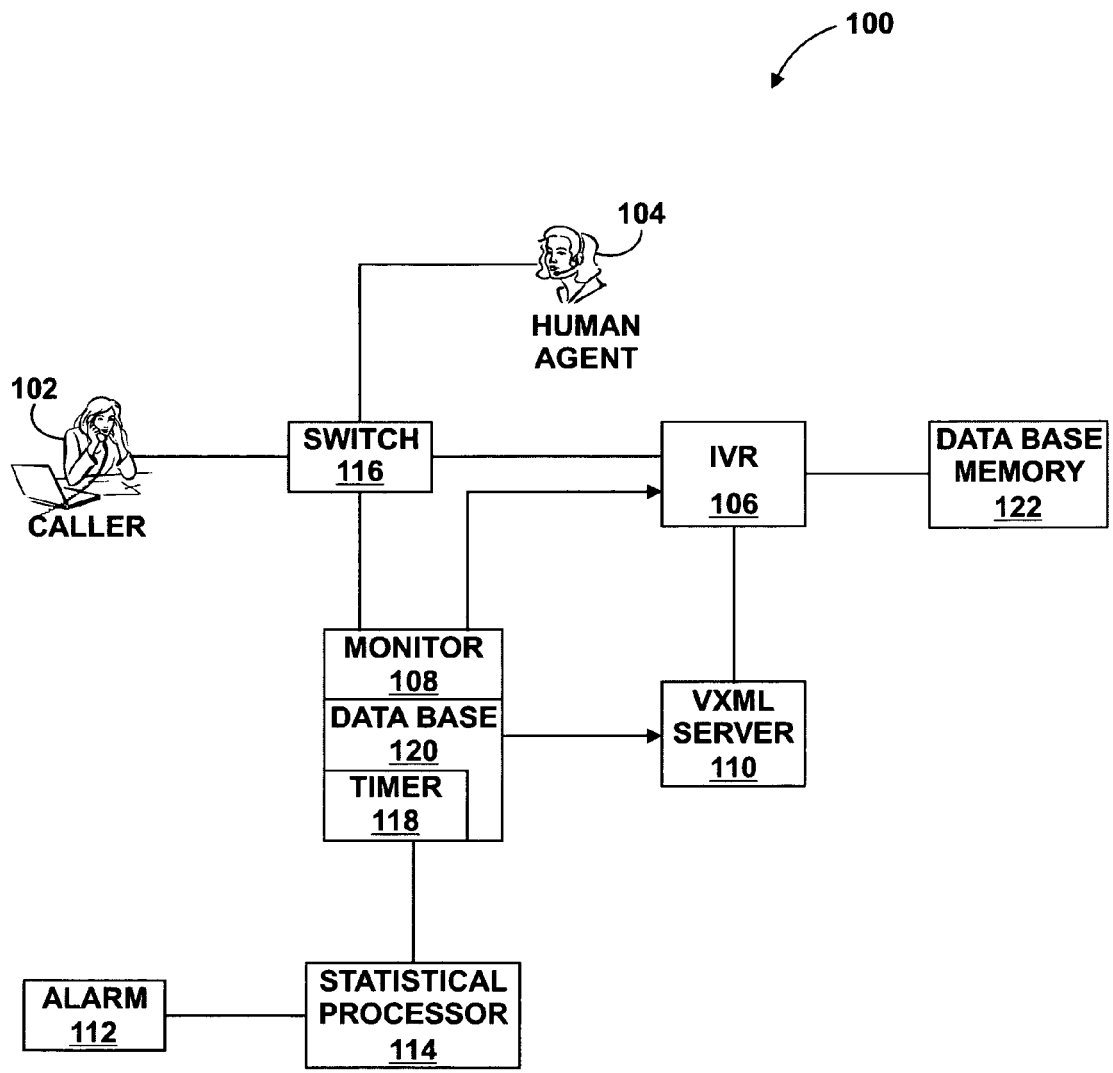
FIG. 1 is a block diagram of an exemplary telecommunication system having automated call processing features.

A system and method for monitoring and reporting automated call-processing performance is disclosed. Initially, performance metrics can be established for normal or acceptable system performance. Performance metrics may be determined for individual components and/or a combination of components, wherein the individual metric may help to provide a performance indicator for the call processing system. The performance metrics can be established by utilizing historical data gathered from past operating characteristics or operating parameters. The performance metric can be calculated from past operating characteristics and could be a statistical distribution or a statistical value. The statistical distribution will often conform to a Gaussian distribution also known as a bell curve and acceptable performance limits can be set based on the Gaussian distribution.

A monitor can collect data over a predetermined time interval and process the monitored data to provide a "near" real-time performance data. When the near real time performance data falls within a pre-defined range of normal operation or under a threshold value, system operation is most likely acceptable. However, when the system performance data is outside a performance metric or exceeds a threshold value an alarm can be set.

The method can utilize historical activity to determine an "average" functionality and normal operational variance around the average. Recent events can be compared to these parameters to evaluate the acceptability of system performance in near real-time. The time sample utilized to average the system activity and caller behavior can be adjusted to "filter" data resulting from known abnormal events such that they do not skew the data distribution. The triggered alarm can activate an e-mail message, a pager, a phone message, and/or some other communication to a human administrator of the system reducing response time for an underperforming system.

A mean and a measure of variance (e.g., standard deviation) can be calculated from a collection of historical data that is indicative of system performance. These metrics can be calculated over any meaningful time interval depending on the needs of the business. The time interval may be referred to as the temporal resolution of the system. In addition, an administrator of the system may select the threshold level at which an alarm will be activated, based on the desired system sensitivity. In one embodiment the time duration for the collected near real time data can be set to a half hour and the threshold value may be set to plus or minus 1 standard deviation from the mean. In this case the temporal resolution is one half hour and the sensitivity to operational variance is equal to one (1) standard deviation.

Some exemplary operational characteristics that can be monitored can include an average call duration, a system response time, a premature disconnect count, a no caller input count, a voice extensible mark up language (VXML) server access time, a caller hang up rate, an excessive confirmation rate, a counter for all parameters, and a false acceptance rate. The system for monitoring performance of the call center described herein can also be implemented in a touchtone response system or any other electronic servicing system that accept human input or interfaces a computer with humans.

In one embodiment, the system can include a server coupled to the IVRS and configured to supply executable objects to the IVRS. A monitor may also be coupled to the IVRS and configured to monitor at least one parameter or performance characteristic of the IVRS related to system operation or caller activity. Statistical analysis on the performance characteristic can provide a performance indicator that is related to system operation. The monitor can also maintain a performance threshold and determine if one or more statistical operating parameters has deviated sufficiently from the performance threshold to initiate an alarm.

A typical speech recognition system goes through an iterative tuning phase, in which the system adapts to different inputs. Often, changes are made to the user interface and the speech recognizer. During this phase and throughout the lifecycle of a speech application, it is very desirable to objectively measure how the system is performing. Thus, as the system tunes and/or receives upgrades it would be desirable to measure system performance. Power outages, software updates, changes to the system architecture, replacement of components or changes to the user interface can all have unintended consequences on system performance. Less than optimum performance can result in a bad experience for the caller. If the system is not constantly monitored, a call center can marginally operate while no one is aware that something is wrong or has gone wrong.

Referring to FIG. 1, an exemplary monitoring system coupled to an exemplary and simplified call servicing system (call center) 100 is illustrated. When a caller 102 contacts the call center 100, the call may be processed by a switch 116. The switch 116 can route the caller to an interactive voice response (IVR) system 106 or to a human agent 104. The IVR system 106 can prompt the caller for identifying information and for the purpose of the call.

Depending upon implementation detail, caller authorization and caller data may be retrieved from database/memory 122. During interaction with the caller 102, the IVR 106 may also access voice extensible mark-up language (VXML) server 110 for executable instructions.

During operation, monitor 108 may be monitoring the activities at switch 116, IVR 106, VXML server 110 and/or other devices (not shown) within a call center 100. In one configuration, timer 118 can be resident with monitor 108 to timestamp data and log durations or time periods for activities of components of the call center 100. Particularly, operational data from the switch 116, the IVR 106 and the VXML server 110 can provide valuable insight into operational performance. Database 120 can store the monitored parameters, the time stamped data, the duration of processes, and other operating parameters and characteristics of the system 100.

In one embodiment, system performance data for each metric of interest is stored in database 120. The statistical processor 114 can compute a mean and variance for each of the system metrics of interest. The statistical processor 114 can then convert the data into z-scores. A z-score is a variable (e.g. one of the metrics of interest) that has been normalized such that the mean is zero and the unit of measure (or system setting) is standard deviations (i.e., a z-score of 1 is equal to 1 standard deviation from the mean). The system threshold can then be set to a particular z-score. For example, a performance metric of one (1) would mean that a system performance that is greater than 1 standard deviation from mean performance level is considered aberrant, and an alarm is issued responsive to such a condition.

Figure 3:
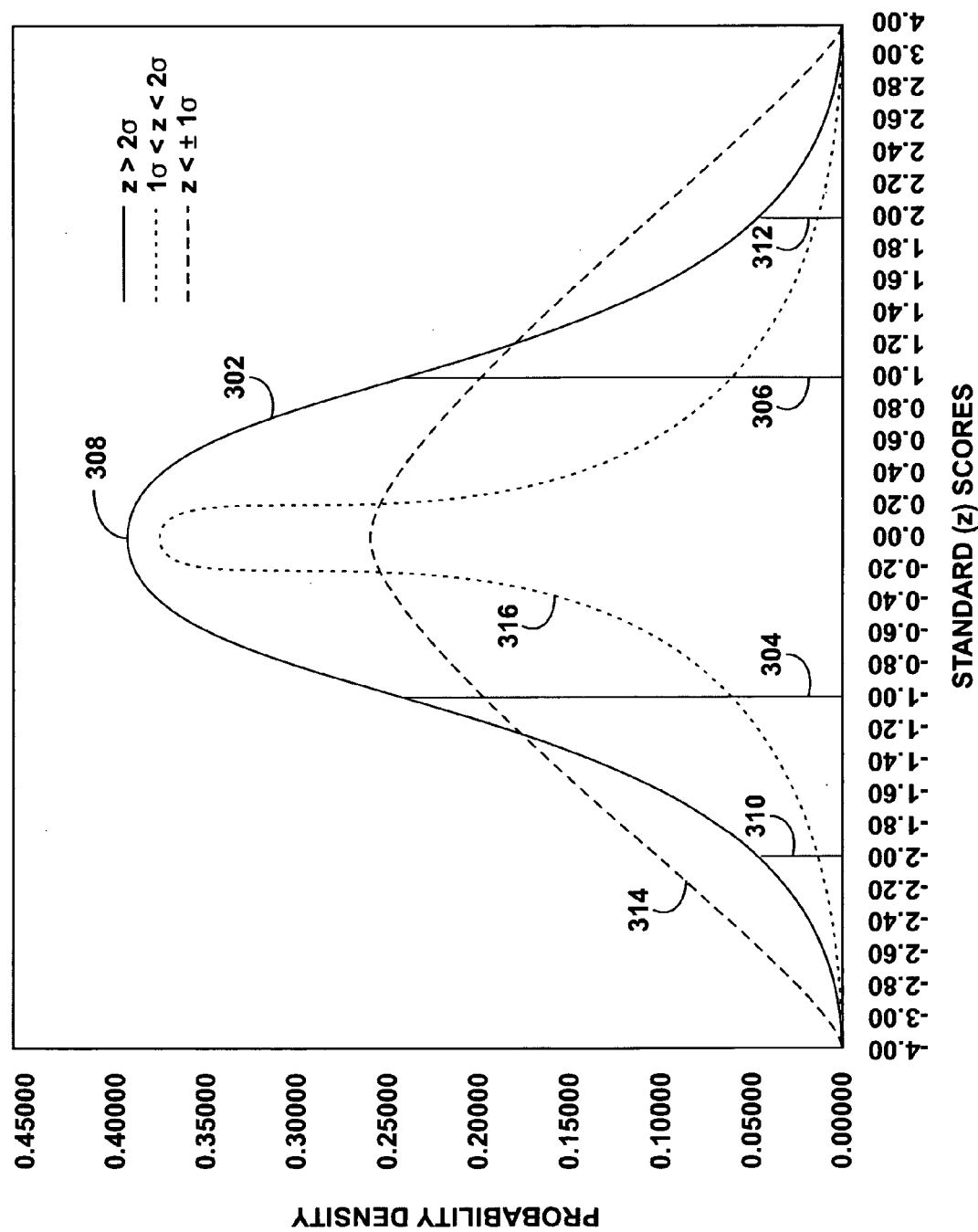
FIG. 3 is a graph illustrating exemplary "bell" curves.

A Gaussian distribution or a "bell" curve (named after its shape) is illustrated in FIG. 3 to aid in understanding the present disclosure. The curve pinnacle 308 shows the mean operating point at the crest or peak of the first curve 302 and the horizontal lines 304 and 306 show possible threshold values that can set as a performance metric. Performance data that falls between threshold values (the threshold values are depicted as horizontal lines) is considered within an acceptable operational range.

Performance that falls outside of the horizontal lines is considered a low probability event, and thus it is considered likely that this is caused by aberrant system behavior. Thus, the bell curve illustrates a concept of how normal and abnormal system behavior may be defined, where acceptable performance measurements (performance indicators) that fall within the middle of the curve are measurements that occur often, resulting from normal system operation or behavior, whereas, measurements falling within the "tails" of the curve occur less often and with a lower probability that the center of the curve and likely represent a problem with the system. FIG. 3 will be described in more detail below.

Referring back to FIG. 1, and in accordance with one embodiment of the present disclosure a value or measurement for an operational characteristic or system parameter can be averaged over a period of time to provide statistical data regarding activities of selected subsystems. For example, over a ten minute time period an average or other statistical value can be calculated to determine a "near" real-time performance of the IVR 106. The near real-time performance can then be compared to the selected threshold value to determine if the system 100 is providing acceptable performance.

Statistical processor 114 can calculate different statistics for different operational parameters. When a recent statistical calculation provides an operating performance value or a data point that is equal to, or exceeds a performance metric or threshold value, or has an excessive deviation from a nominal performance, an alarm 112 can be activated by the statistical processor 114 or by monitor 108.

In another embodiment, an alarm can be triggered after detection of an extreme value representing an operational parameter. Extreme values may result from a power outage or a component of the system "locking up." Thus, no time sample may be required for detection of abnormal system performance.

The activated alarm can produce an e-mail, a page, or a phone call intended for an administrator of the system (not shown). The statistical processor 114 can determine an operational performance characteristic over the selected time period and compare it to a multiple of the standard deviation from the mean. In one configuration, the sample time can be set at a half hour and the threshold value may be set at plus or minus 1 standard deviation from the mean. However, the threshold can be adjusted for each operational parameter to avoid alarms that do not accurately indicate an underperforming system.

Figure 2:
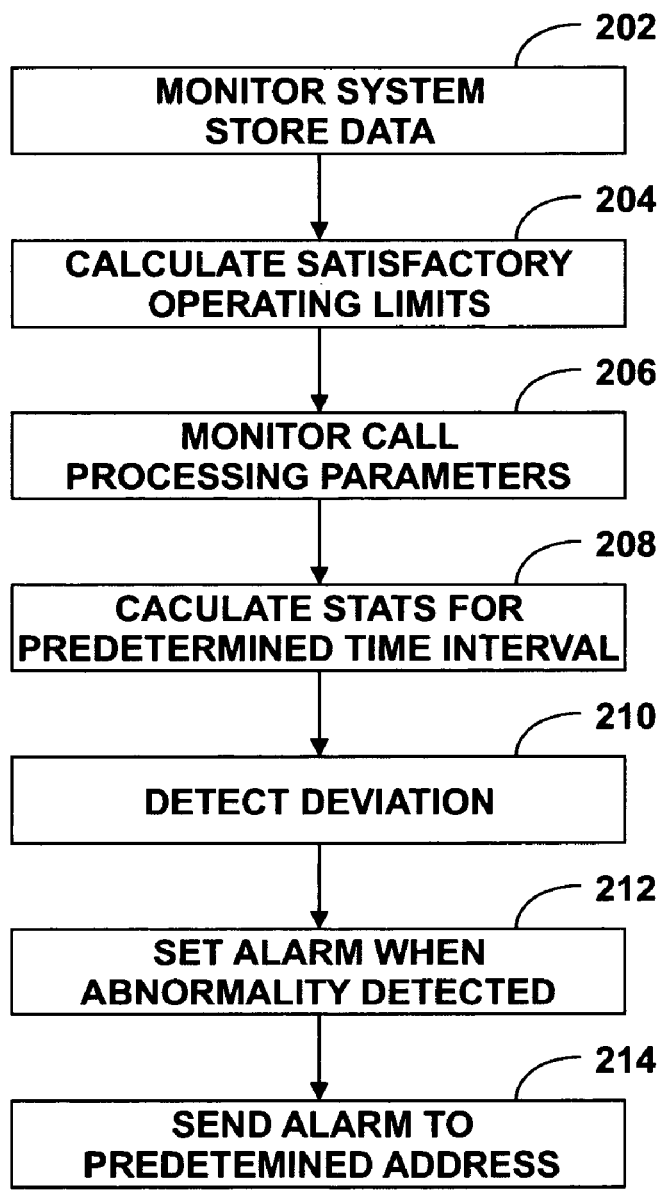
FIG. 2 is a flow diagram that illustrates a possible method of operation of the system of FIG. 1.

Referring to FIG. 2, an exemplary method that could be utilized by the system of FIG. 1 is illustrated. At step 202 operational parameters of a call processing system are monitored and data indicative of the operational parameters is stored. From this stored data, a satisfactory performance limit or performance metric is determined at step 204. The satisfactory performance metric can be a high or a low threshold value, a deviation from a normal operating point or a range of values. System operating parameters are monitored and stored at step 206. At step 208 calculations to provide statistics on past system performance may be made utilizing the stored data. Calculations would typically be made for a single operational characteristic over a given time period, however, more than one characteristic for smaller or larger time durations may also be utilized to provide an indicator of system performance.

At step 210, the calculated performance value can be compared to the performance metric or threshold value indicative of acceptable system performance. At step 212, a system may detect when operating characteristics deviate from satisfactory system performance limit or a performance falls below a baseline, a threshold or outside of the satisfactory performance limit. Responsive to the detection, an alarm can be set to notify a user as illustrated in step 214. Generally, when the system is operating within the satisfactory performance limit, it can be assumed that the system does not need user intervention. When call center performance falls below or outside an acceptable level, all or some identified portion of the calls may be routed to a human operator to avoid or minimize caller interaction with a "broken" IVRS.

Referring to FIG. 3 statistical curve, graph, or set of averaged operational parameters may provide a statistical distribution embodied by a curve such as first curve 302. The peak 308 of the curve 302 may illustrate an "arithmetic mean" or typical operating point for an operational parameter. The pinnacle 308 is a metric of an operating point that the system operates at more often than other operating points hence the greater value on the graph. Operating points to the left of the pinnacle 308 may be a better performance and operating points to the right of the curve may be a worse performance or vise versa.

The curve 302 can be representative of any monitored parameter or combination of operating parameter such as an average call duration, a system or component response time, a premature disconnect count, a voice extensible mark up language (VXML) server access time, a caller hang up rate, an excessive confirmation rate, and a false acceptance rate.

First threshold 304, second threshold 306, third threshold 310 and fourth threshold 312 are exemplary threshold values, which may be defined in terms of z-scores or standard deviations from the mean. Thus, a system designer can select a threshold by selecting a standard deviation from the mean such as one standard deviation, two standard deviations and so on. The exact shape of the curve may vary for different metrics such that some curves may be wider or narrower, depending on the variance of system performance for a given metric. Also, the data may not conform entirely to a normal distribution and may be positively or negatively skewed. However, the disclosed system still provides a robust monitoring system when such "imperfect data" exists. For example, second curve 314 and third curve 316 illustrate bell curves having different profiles than first curve 302.

Many system metrics could be utilized to monitor performance. In one embodiment, system performance metrics can detect specific verbal responses such as "operator please" or "I need help" and provide a count of the occurrence of "distress responses" over a given time period. In another embodiment non-responses, lack of confirmations and confidence values associated with caller input can be monitored. Confidence levels can be calculated based on a caller's response to an IVRS prompt. The confidence value for many callers can be accumulated and when such value falls below a threshold level during a given time period the system can also set an alarm. Other performance metrics that could be monitored and processed are "too much speech" or speech input exceeding a certain amount of time, and a high number of unrecognizable phonemes. The source or component creating the alarm can also be logged such that a user may have a better understanding of what portion of the system needs maintenance or repair.

Many mathematical formulas could be utilized to create statistics by weighting different call performance metrics and adding them to others without departing from the scope of the present disclosure. With the disclosed system and method, the call center can avoid prolonged periods of time where the system is underperforming.

Thus, the disclosed method identifies an underperforming or non-performing system quicker, provides an enhanced customer experience, and reduces the quantity of callers having a negative interaction with an automated call support system. An increased level of customer satisfaction can thereby be realized.

The disclosed system and method allows tracking of related human behaviors and may take appropriate actions in various circumstances. The disclosed system and method is applicable to multiple user interface modalities, and can process caller or user input from interactive systems such as websites, touchtone phones, speech recognition systems, and other user interface systems. In addition, the disclosed system and method may lead to a reduced level of abandoned calls (i.e., caller hangs up prior to completing their task), thereby reducing provider system costs (e.g., lower port costs and fewer repeat calls). Some inconsistencies in processing caller inputs are more frustrating to callers than others. The disclosed system and method may provide improved caller satisfaction, since the user on the average can avoid being caught in error-prone situations and frustrating endless loops caused by a broken or impaired automated call processing system.

The above-disclosed subject matter is to be considered illustrative, and not restrictive, and the appended claims are intended to cover all such modifications, enhancements, and other embodiments that fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of monitoring an automated call processing system comprising:
    monitoring a plurality of operating parameters;
    maintaining a first count of first statistical values associated with a first operating parameter of the plurality of operating parameters;
    maintaining a second count of second statistical values associated with a second operating parameter of the plurality of operating parameters;
    weighting a first performance metric established from the first count associated with the first operating parameter differently than a second performance metric established from the second count associated with the second operating parameter;
    adding the first weighted performance metric to the second weighted performance metric to establish a third performance metric, wherein the third performance metric is established based on a time sample of historical data collected from past operational characteristics of a call processing center, and wherein the time sample is adjusted to filter data;
    establishing a threshold associated with the third performance metric;
    tracking a performance indicator in near real time;
    detecting a deviation between the performance indicator and the third performance metric; and
    triggering an alarm when the detected deviation exceeds the threshold.

2. The method of claim 1, wherein the plurality of operating parameters includes at least one of: an average call duration, a system response time, a premature disconnect count, a verbal extensible mark up language server access time, a caller hang up rate, an excessive confirmation rate, and a false acceptance rate.

3. The method of claim 1, further comprising transmitting a message responsive to an alarm trigger.

4. The method of claim 1, wherein the third performance metric is a mean of the historical data and the threshold is based on at least one of a standard deviation and a z-score developed from the historical data.

5. The method of claim 4, wherein the alarm is triggered when the performance indicator is greater than or less than plus or minus one (1) standard deviation or a z-score unit from the mean of the historical data.

6. The method of claim 1, further comprising comparing the performance indicator and the third performance metric on a periodic basis.

7. The method of claim 1, wherein the performance indicator is based on activities related to one of an interactive voice response system, a speech recognition module, and a voice extensible mark up language server.

8. The method of claim 1, wherein the alarm is triggered when the detected deviation indicates one of a locked up component and a power outage.

9. The method of claim 1, wherein a subsequent caller is routed to an agent when the detected deviation exceeds the threshold.

10. A system for monitoring performance of a call center, the system comprising:
- an interactive voice response system configured to accept spoken caller input and to process a call responsive to the spoken caller input;
- a server coupled to the interactive voice response system, the server configured to supply executable objects to the interactive voice response system; and
- a monitor coupled to the interactive voice response system, the monitor configured to:
  - monitor a combination of a plurality of operating parameters of the interactive voice response system related to caller activity;
  - maintain a first count of first statistical values associated with a first operating parameter;
  - maintain a second count of second statistical values associated with a second operating parameter;
  - weight a first performance metric established from the first count associated with the first operating parameter differently than a second performance metric established from the second count associated with the second operating parameter;
  - add the first weighted performance metric to the second weighted performance metric to determine a third performance metric;
  - maintain the third performance metric based on a time sample of historical data for the combination of the plurality of operating parameters; and
  - detect a deviation between the combination of the plurality of operating parameters and the third performance metric, wherein the time sample is adjusted to filter data resulting from known abnormal events to prevent the known abnormal events from skewing a data distribution.

11. The system of claim 10, wherein at least one of the plurality of operating parameters includes at least one of: a call time duration, a caller hang up, and a delay time.

12. The system of claim 10, further comprising a database coupled to the monitor and configured to store information associated with the at least one of the plurality of operating parameters.

13. The system of claim 12, further comprising a statistical processor configured to calculate one of an actual mean, an actual standard deviation, an actual range, and an actual median for the stored information.

14. The system of claim 13, further comprising calculating one of the actual mean, the actual standard deviation, the actual range, and the actual median utilizing data from approximately a previous half hour time period.

15. The system of claim 10, further comprising an alarm generator configured to trigger an alarm when the detected deviation exceeds a threshold.

16. The system of claim 10, further comprising a switch for switching a caller to a human operator when the detected deviation exceeds a threshold.

17. A non-transitory computer readable storage medium embodying a program of instructions to manipulate a computing platform to:
- combine statistical data associated with a plurality of operating parameters of a call processing center to establish a third performance metric by:
  - maintaining a first count of first statistical values associated with a first operating parameter of the plurality of operating parameters;
  - maintaining a second count of second statistical values associated with a second operating parameter of the plurality of operating parameters; and
  - weighting a first performance metric established from the first count associated with the first operating parameter differently than a second performance metric established from the second count associated with the second operating parameter; and
  - adding the first weighted performance metric to the second weighted performance metric, wherein the third performance metric is established based on a time sample of historical data, and wherein the time sample is adjusted to filter data;
- track an actual performance of a combination of the plurality of operating parameters in near real time;
- detect a deviation between the third performance metric and the actual performance; and
- trigger an alarm when the detected deviation exceeds a threshold.

18. The non-transitory computer readable storage medium of claim 17, wherein at least one of the plurality of operational parameters includes at least one of: an average call duration, a system response time, a premature disconnect count, a voice extensible mark up language server access time, a caller hang up rate, an excessive confirmation rate, and a false acceptance rate.

19. The non-transitory computer readable storage medium of claim 17, further comprising instructions to manipulate the computing platform to transmit a message when the detected deviation exceeds the threshold.

20. The non-transitory computer readable storage medium of claim 17, further comprising instructions to switch a caller to a human operator when the detected deviation exceeds the threshold.

* * * * *